(12) United States Patent
Yasunobe

(10) Patent No.: US 9,352,673 B2
(45) Date of Patent: May 31, 2016

(54) ARMREST

(71) Applicant: KUBOTA CORPORATION, Osaka (JP)

(72) Inventor: Daisuke Yasunobe, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/492,525

(22) Filed: Sep. 22, 2014

(65) Prior Publication Data

US 2015/0232000 A1 Aug. 20, 2015

(30) Foreign Application Priority Data

Feb. 19, 2014 (JP) ................................. 2014-029584
Feb. 19, 2014 (JP) ................................. 2014-029585

(51) Int. Cl.
*B60N 2/46* (2006.01)

(52) U.S. Cl.
CPC .............. *B60N 2/4606* (2013.01); *B60N 2/464* (2013.01); *B60N 2/4693* (2013.01)

(58) Field of Classification Search
CPC ........ A47C 7/543; A47C 1/03; B60N 2/4606; B60N 2/464
USPC ............. 297/411.32, 411.34, 411.36, 411.38, 297/411.45
See application file for complete search history.

(56) References Cited

U.S. PATENT DOCUMENTS

| | | | |
|---|---|---|---|
| 6,341,821 B1 * | 1/2002 | Rousseau | 297/411.36 |
| 7,140,688 B2 * | 11/2006 | Hann | 297/411.32 |
| 7,252,338 B2 * | 8/2007 | Crossman | 297/411.33 |
| 7,797,918 B2 * | 9/2010 | Drake et al. | 56/323 |
| 8,733,841 B2 * | 5/2014 | Morris | 297/411.36 |
| 8,950,816 B2 * | 2/2015 | Ott et al. | 297/411.32 |
| 2003/0184123 A1 | 10/2003 | Amamiya | |
| 2005/0006942 A1 * | 1/2005 | Bremner | 297/411.36 |
| 2005/0139034 A1 | 6/2005 | Komine | |
| 2007/0085404 A1 * | 4/2007 | Chen et al. | 297/411.38 |
| 2007/0096531 A1 * | 5/2007 | Bruns et al. | 297/411.36 |
| 2007/0164594 A1 * | 7/2007 | Yang | 297/411.32 |
| 2007/0295551 A1 | 12/2007 | Proud | |
| 2009/0230749 A1 * | 9/2009 | Kostak et al. | 297/411.36 |
| 2010/0152661 A1 | 6/2010 | Clavadetscher | |
| 2011/0236130 A1 * | 9/2011 | Klein et al. | 404/83 |

FOREIGN PATENT DOCUMENTS

| | | |
|---|---|---|
| JP | 2005-335429 | 12/2005 |
| JP | 2008-105598 | 5/2008 |
| KR | 10-2010-0002236 | 1/2010 |

OTHER PUBLICATIONS

Korean Office Action dated Sep. 10, 2015 with English language translation.

* cited by examiner

*Primary Examiner* — Laurie K Cranmer
(74) *Attorney, Agent, or Firm* — Greenblum & Bernstein, P.L.C.

(57) ABSTRACT

An armrest apparatus includes an armrest arranged on one lateral side of a driver seat. A height adjustment mechanism adjusts a height of the armrest relative to the driver seat. A flip-up mechanism swingably supports the armrest about a swing shaft center oriented in a lateral direction relative to the driver seat, whereby the armrest can be flipped up from a use position to a non-use position. The armrest apparatus also allows for height adjustment based on the physique of a driver and has an armrest that is movable to a position unlikely to interfere with boarding and unboarding.

12 Claims, 12 Drawing Sheets

ARMREST

CROSS-REFERENCE TO RELATED APPLICATIONS

The present application claims priority under 35 U.S.C. §119 of Japanese Application Nos. 2014-029585 and 2014-029584, both filed on Feb. 19, 2014, the disclosures of which are hereby expressly incorporated by reference in their entireties.

BACKGROUND OF THE INVENTION

1. Field of the Invention

The present invention relates to an armrest apparatus having an armrest arranged on a lateral side portion of a driver seat.

2. Description of Related Art

A known armrest apparatus is disclosed in Japanese Patent Laid-Open Publication No. 2005-335429 (armrest apparatus (40) therein). The armrest apparatus disclosed in Japanese Patent Laid-Open Publication No. 2005-335429 has a height adjustment mechanism (position adjustment mechanism (51)) to adjust the height of an armrest (armrest (41)) relative to a driver seat (swivel seat (31)). The height adjustment mechanism allows adjustment of the height of the armrest so as to fit the physique of a driver.

In the conventional armrest apparatus described above, the height of the armrest can be adjusted with the height adjustment mechanism so as to fit the physique of the driver. However, the armrest cannot be moved to a position unlikely to interfere with boarding and unboarding.

In view of the above, an improved armrest apparatus would have an armrest height-adjustable to fit the physique of the driver and also be movable to a position unlikely to interfere with boarding and unboarding.

SUMMARY OF THE INVENTION

An advantage of the present invention is to provide an armrest apparatus including an armrest arranged on a lateral side portion of a driver seat; a height adjustment mechanism adjusting a height of the armrest relative to the driver seat; and a flip-up mechanism swingably supporting the armrest around a swing shaft center in a lateral direction relative to the driver seat, allowing flipping up the armrest from a use position to a non-use position.

According to the present configuration, the height adjustment mechanism allows height adjustment of the armrest so as to fit the physique of a driver. With the flip-up mechanism of the invention, which flips up the armrest from the use position to the non-use position, the armrest is unlikely to interfere with boarding and unboarding.

According to another non-limiting embodiment of the invention, there is provided a work vehicle comprising a driver seat, an armrest arranged on a lateral side of the driver seat and a height adjustment mechanism adjusting a height of the armrest. A flip-up mechanism swings the armrest around a shaft center oriented in a lateral direction relative to the driver seat, whereby the arm rest can flip up from a use position to a non-use position.

In embodiments, the flip-up mechanism is located behind the height adjustment mechanism of the armrest.

In embodiments, the flip-up mechanism is arranged on a rear end portion of the armrest.

In embodiments, the flip-up mechanism comprises an armrest support member supporting the armrest, a swing shaft oriented in the lateral direction and being configured to allow the armrest to be swingably attached, and a friction holding mechanism capable of friction-holding the armrest to the swing shaft.

In embodiments, the height adjustment mechanism comprises the armrest support member supporting the armrest, a base arranged on the lateral side and a bolt engagable with an elongated hole arranged on one of the base and the armrest support member, the bolt being configured to connected together the base and the armrest support member.

According to another non-limiting embodiment of the invention, there is provided a work vehicle comprising a driver seat, an armrest arranged on a lateral side of the driver seat, an armrest support member supporting the armrest, a base arranged on a lateral side of the driver seat, a height adjustment mechanism adjusting a height of the armrest and a flip-up mechanism structured and arranged to allow the armrest to swing around a shaft center oriented in a lateral direction relative to the driver seat and to move between a use position to a non-use position. The flip-up mechanism utilizes a swing shaft oriented in a lateral direction and coupled to the armrest support member, said swing shaft allowing the armrest to be swingably attached and a friction holding mechanism capable of friction-holding the armrest to the swing shaft.

According to another non-limiting embodiment of the invention, there is provided a work vehicle comprising a driver seat, an armrest arranged on a lateral side of the driver seat, plural working machine control members arranged on the armrest, a height adjustment mechanism adjusting a height of the armrest relative to the driver seat, and a flip-up mechanism configured to allow the armrest to pivot from a use down position to a non-use up position. A pivot axis of the flip-up mechanism is arranged behind an imaginary line defined by an up and down movement of the height adjustment mechanism.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

Non-limiting embodiments of the present invention are described with reference to the accompanying drawings.

Overall Configuration of Tractor

Figure 1:
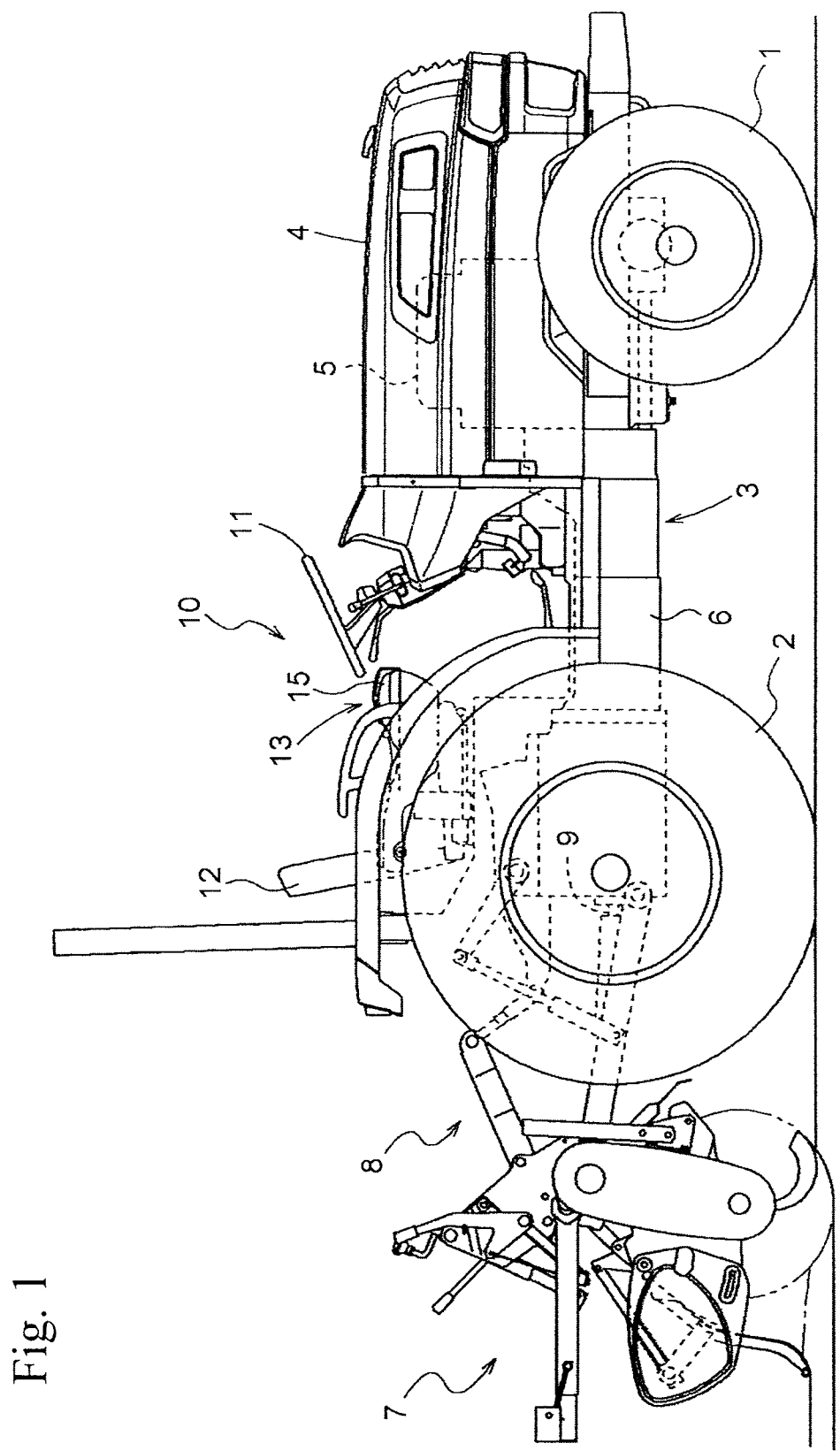
FIG. 1 shows a right side view of a tractor.
Figure 2:
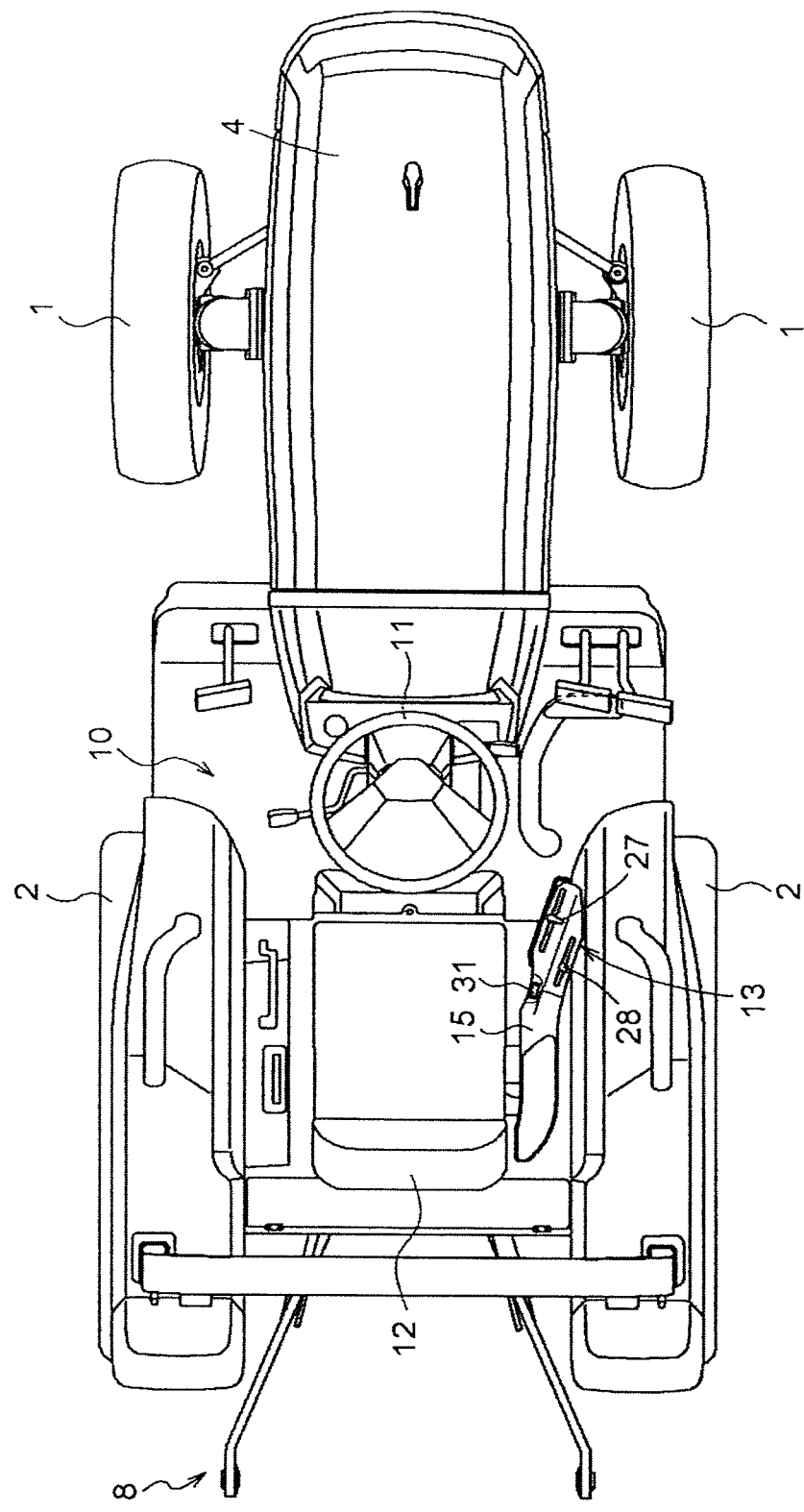
FIG. 2 shows a top or plan view of the tractor.

FIGS. 1 and 2 illustrate a tractor as a work vehicle which can utilize the armrest apparatus. The tractor has a traveling body 3 including front wheels 1 and rear wheels 2. A hood 4 is located at a front portion of the traveling body 3. An engine 5 is housed under the hood 4. A transmission case 6 is connected to a rear end portion of the engine 5. The transmission case 6 houses a transmission (not shown in the drawings) shifting transmission of power from the engine 5. A rotary tiller 7 (corresponding to a "work machine" according to the present invention) can be connected to a rear end portion of the transmission case 6 through a link mechanism 8 so as to be movable upward and downward. The power from the transmission case 6 is transmitted through a PTO shaft 9 to the work machine 7.

A driving portion 10 is arranged on a rear portion of the traveling machine 3. The driving portion 10 has a steering wheel 11 and a driver seat 12. An armrest apparatus 13 is provided to a right side portion of the driver seat 12.

Driver Seat

Figure 3:
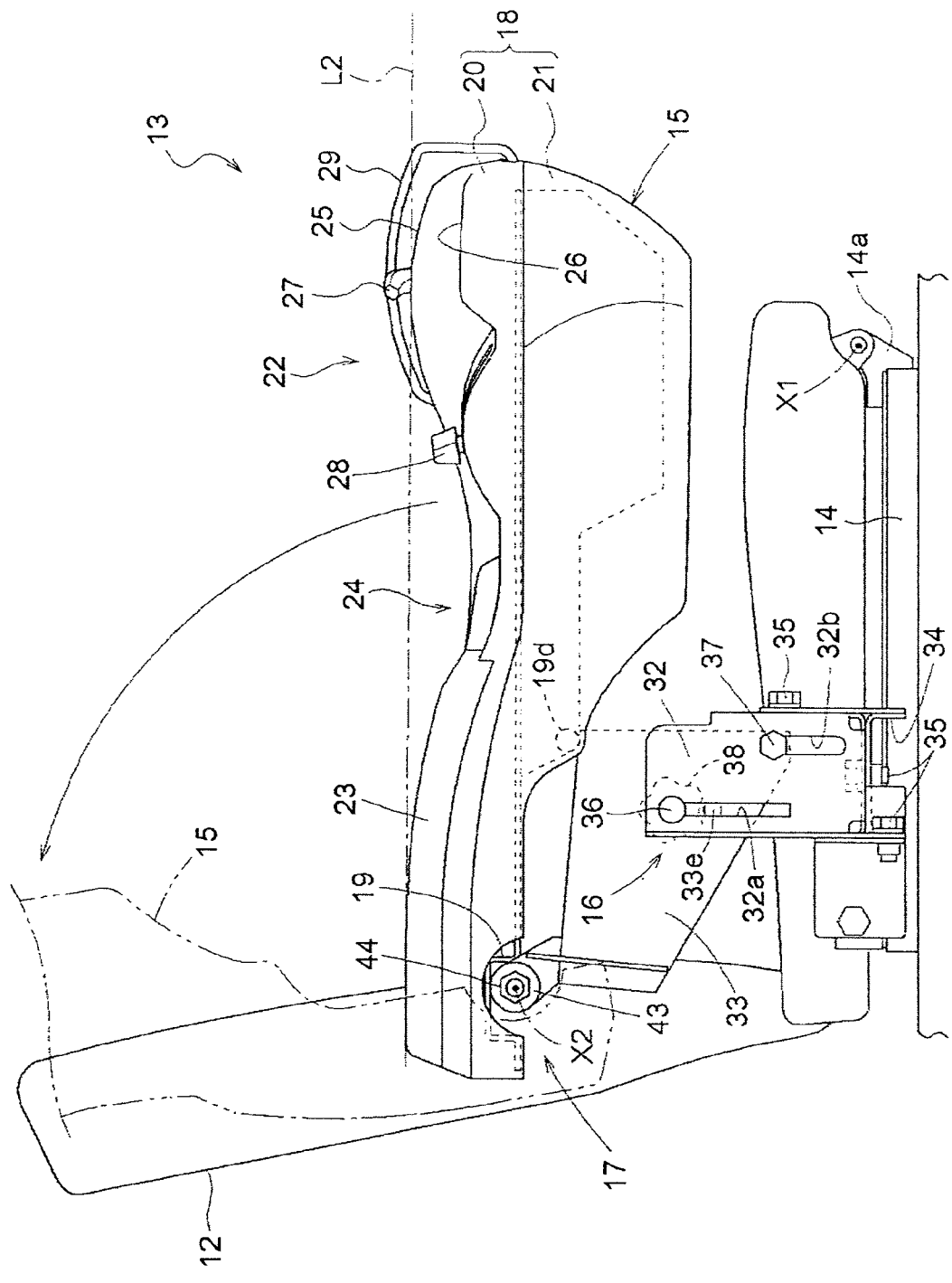
FIG. 3 shows a right side view of a driver seat and an armrest apparatus in accordance with the invention.

With reference to FIG. 3, the driver seat 12 is placed on and supported by a driver seat frame 14. A front end portion of a seat base of the driver seat 12 extends forward of a seat back and is supported by a support 14a of the driver seat frame 14 so as to be swingable around a swing shaft center axis X1 in a right/left direction. A position of the driver seat frame 14 can be adjusted in a front/rear direction.

Armrest Apparatus

Figure 5:
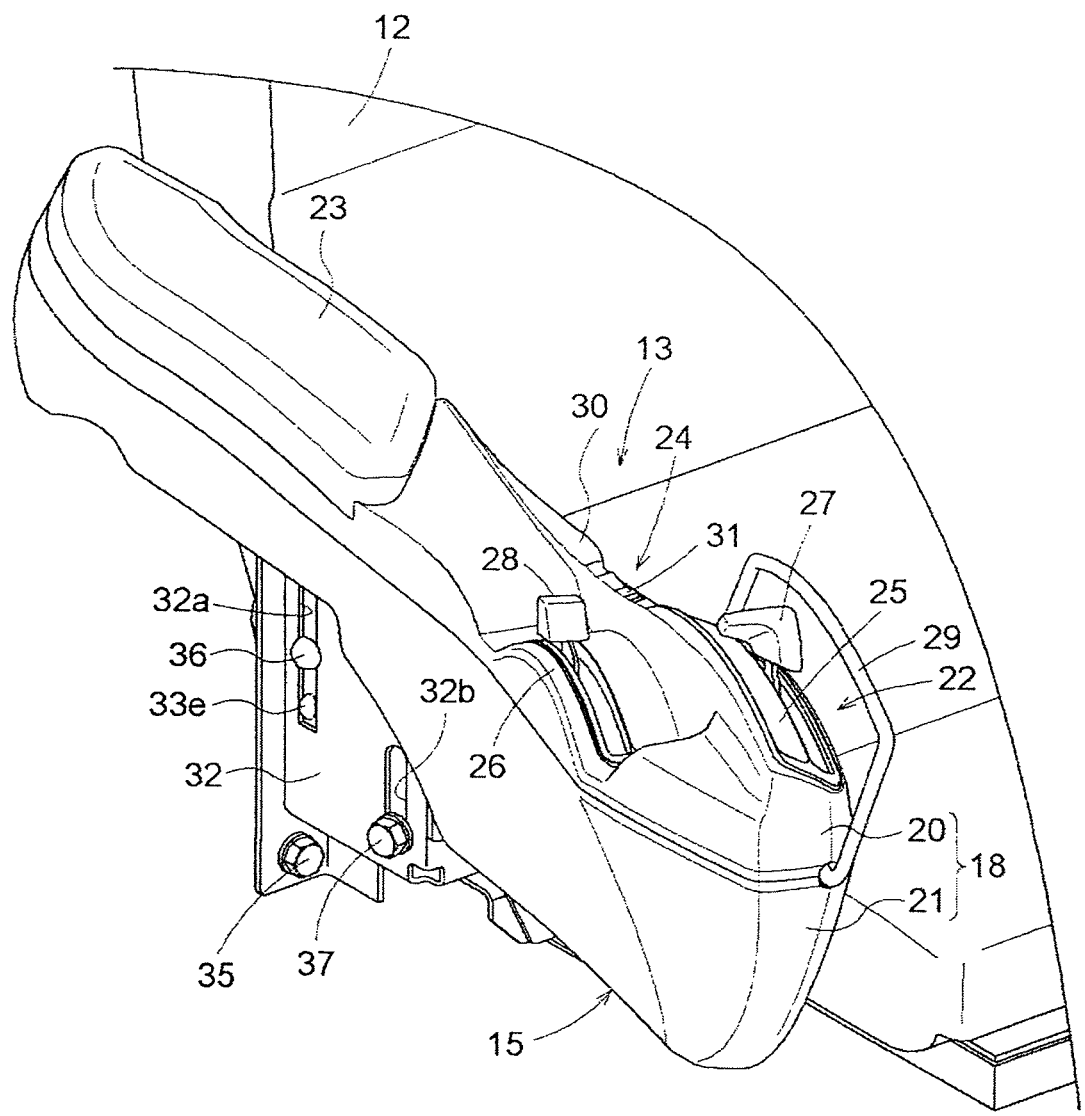
FIG. 5 shows a right perspective view of the armrest apparatus.

With reference to FIGS. 3 and 5, the armrest apparatus 13 includes main components; an armrest 15, a height adjustment mechanism 16, and a flip-up mechanism 17.

Armrest

The armrest 15 includes the following features: a change speed lever 27 (corresponding to a "change speed operation tool" according to the present invention) for changing speed of the transmission; a lift lever 28 (corresponding to a "lift operation tool" according to the present invention) for raising and lowering the rotary tiller 7; a swing-type lift switch 31 (corresponding to an "operation portion" and a "switch" according to the present invention) for raising and lowering the rotary tiller 7. In a top or plan view, the armrest 15 inclines to the right as a front portion approaches a front end relative to a rear portion.

The armrest 15 also utilizes a support or frame 19 and a cover 18 externally mounted to the frame 19. The cover 18 includes an upper cover 20 and a lower cover 21, which are vertically combined or connected with each other. A hand rest or area 22 for placing a hand thereon is arranged on a front portion of the upper cover 20. An elbow rest or area 23 for placing an elbow thereon is arranged on a rear portion of the upper cover 20. A recess 24 is arranged on the upper cover 20 between the hand rest 22 and the elbow rest 23.

Hand Rest

The hand rest 22 has a high portion 25 and a low portion 26, which have different height positions from each other. Specifically, the high portion 25 is provided to a left-hand side portion and the low portion 26 is provided to a right-hand side portion of the hand rest 22 with a boundary L1 there between.

The change speed lever 27 is arranged on the high portion 25 so as to swing in the front/rear direction. The change speed lever 27 is positioned to the left of the lift lever 28 (more inward in a lateral direction than the lift lever 28). In other words, the change speed lever 27 is positioned more proximate to the driver seat 12 than the lift lever 28 in a vehicle-width direction. A guard 29 is provided to the left side portion of the hand rest 22 to prevent erroneous or inadvertent operation of the change speed lever 27.

The lift lever 28 is arranged on the low portion 26 so as to swing in the front/rear direction. In this way, operating the lift lever 28 forward lowers the rotary tiller 7 while operating the lift lever 28 rearward raises the rotary tiller 7.

Recess

Figure 4:
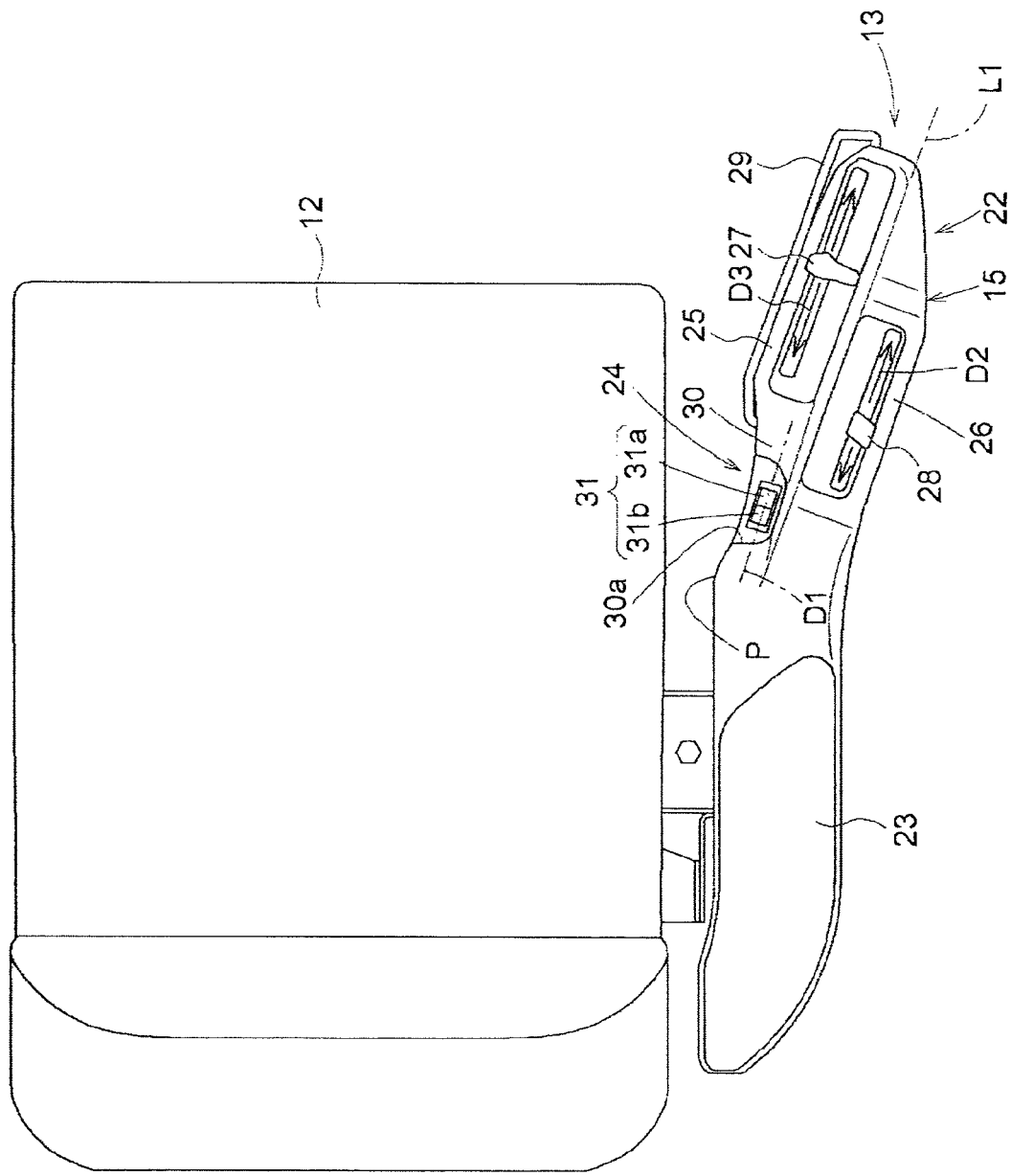
FIG. 4 shows a top or plan view of the driver seat and the armrest apparatus of FIG. 3.

A recess 24 is arranged on the armrest so as to be indented relative to a connecting line L2 that connects a top of the hand rest 22 and a top of the elbow rest 23. In the recess 24, the lift switch 31 is located at a left portion (upper-left surface 30) relative to the boundary L1 Specifically, the lift switch 31 is thus positioned in a portion proximate to an inner side in the lateral direction of the recess 24. In this way, the lift switch 31 can advantageously be positioned in a portion proximate to the driver seat 12 in the vehicle-width direction. As is apparent in FIG. 4, the recess portion 30a is open to the left (inward in the lateral direction) and is thus open to the driver seat 12 in the vehicle-width direction.

Lift Switch

The lift switch 31 is positioned behind the change speed lever 27 and the lift lever 28. The lift switch 31 is also positioned to the rear of the guard 29 and farther forward from a bending or angled portion P between a front portion and a rear portion of the armrest 15. The lift switch 31 can be what is commonly-called a seesaw or rocker switch and is capable of swinging in the front/rear direction. A swing direction D1 of the lift switch 31 is provided so as to be substantially parallel to a swing direction D2 of the lift lever 28 as well as substantially parallel to a swing direction D3 of the change speed lever 27.

The lift switch 31 has a lowering operation portion 31a for the rotary tiller 7 and a raising operation portion 31b for the rotary tiller 7. Pressing the lowering operation portion 31a of the lift switch 31 automatically lowers the rotary tiller 7 to the lowest position. Pressing the raising operation portion 31b of the lift switch 31 automatically raises the rotary tiller 7 to the highest position. Separately from the lift switch 31, a switch having a similar function to the lift switch 31 (not shown in the drawings) may be provided to a periphery of the steering wheel 11.

A front portion of the lift switch 31 can be used in the lowering operation portion 31a and a rear portion of the lift switch 31 can be used in the raising operation portion 31b. Specifically, the swing direction of the lift switch 31 and the swing direction of the lift lever 28 to lower the rotary tiller 7 are concurrently a forward direction, and the swing direction of the lift switch 31 and the swing direction of the lift lever 28 to raise the rotary tiller 7 are concurrently a rearward direction.

Height Adjustment Mechanism

With reference to FIGS. 6 to 10, the height adjustment mechanism 16 adjusts the height of the armrest 15 relative to the driver seat 12. The height adjustment mechanism 16 has a base 32 coupled to the driver seat 12 side and a bracket 33 coupled to the armrest 15 side.

Base

The base 32 is fixed to a frame 34 on the driver seat frame 14 side with a bolt 35. A position of the base 32 is adjustable in the left/right direction relative to the frame 34 (driver seat frame 14) through an elongated hole (not shown in the drawings) in the left/right direction to which the bolt 35 is inserted. The base 32 has a first elongated hole 32a oriented in an up/down direction and a second elongated hole 32b oriented in the up/down direction. The first elongated hole 32a is an elongated hole having substantially a rectangular shape oriented in the up/down direction (elongated rectangular hole). The second elongated hole 32b is an elongated hole having substantially a rectangular shape oriented in the up/down direction (elongated circular hole). The first elongated hole 32a is offset toward an upper end side of the base 32 while the second elongated hole 32b is offset toward a lower end side of the base 32. A lower end portion of the first elongated hole 32a and an upper end portion of the second elongated hole 32b overlap in the up/down direction.

Bracket

The bracket 33 is positioned to the left of the base 32 (more inward in the lateral direction than the base 32). In other words, the bracket 33 is positioned more proximate to the driver seat 12 than the base 32 in the vehicle-width direction. A rear end of the bracket 33 projects more rearward than a rear end of the base 32. A front end of the bracket 33 retreats more rearward than a front end of the base 32.

A bent portion 33a projects to the left and is arranged on an upper end portion of the bracket 33. A support 33b is provided on a rear end portion of the bent portion 33a. A swing shaft 33c is oriented in the left/right direction is arranged in an area of the support 33b so as to project to the right. A flange 33d is provided to a rear end portion of the bracket 33, with the flange 33d extending from a right side surface. A guide projection 33e having a substantially circular shape projects toward the base 32 (to the right) and extends into the first elongated hole 32a of the bracket 33. An edge portion of the projection 33e is in contact with or in guiding engagement with an edge or edges of the first elongated hole 32a of the base 32.

The bracket 33 is fixed to the base 32 with a first bolt 36 and a second bolt 37. The first bolt 36 is a square neck bolt (see FIG. 9). A square neck 36a of the first bolt 36 is fitted to the first elongated hole 32a. The first bolt 36 is inserted into the first elongated hole 32a from the right side of the base 32 (the first elongated hole 32a to inward in the lateral direction). Specifically, the first bolt 36 is inserted to the first elongated hole 32a toward the driver seat 12 in the vehicle-width direction. A knob nut 38 is engaged with a free end portion of the first bolt 36. Specifically, the knob nut 38 is coupled to the free end portion of the first bolt 36 on the side of the bracket 33, which is positioned on the inner side in the lateral direction of the base 32 and the bracket 33. In other words, the knob nut 38 is provided to the fore end portion of the first bolt 36 on the side of the bracket 33, which is positioned on the side of the driver seat 12 in the vehicle-width direction of the base 32 and the bracket 33. Furthermore, the knob nut 38 is located to the right more than a left side surface of the armrest 15 (a left/right center side of the armrest) in a state of being attached to the free end portion of the first bolt 36. In other words, the knob nut 38 is inserted in a space below the bending portion 33a (see FIG. 9).

The second bolt 37 is a shoulder bolt. The shoulder (large diameter portion) 37a of the second bolt 37 is fitted to the second elongated hole 32b. The second bolt 37 is inserted into the second elongated hole 32b from the right side of the base 32 (the second elongated hole 32b to inward in the lateral direction). Specifically, the second bolt 37 is inserted into the second elongated hole 32b toward the driver seat 12 in the vehicle-width direction (see FIG. 10). A nut 39 (weld nut) associated with the second bolt 37 is fixed to the left side surface of the bracket 33.

Method of Adjusting Height Using Height Adjustment Mechanism

Figure 6:
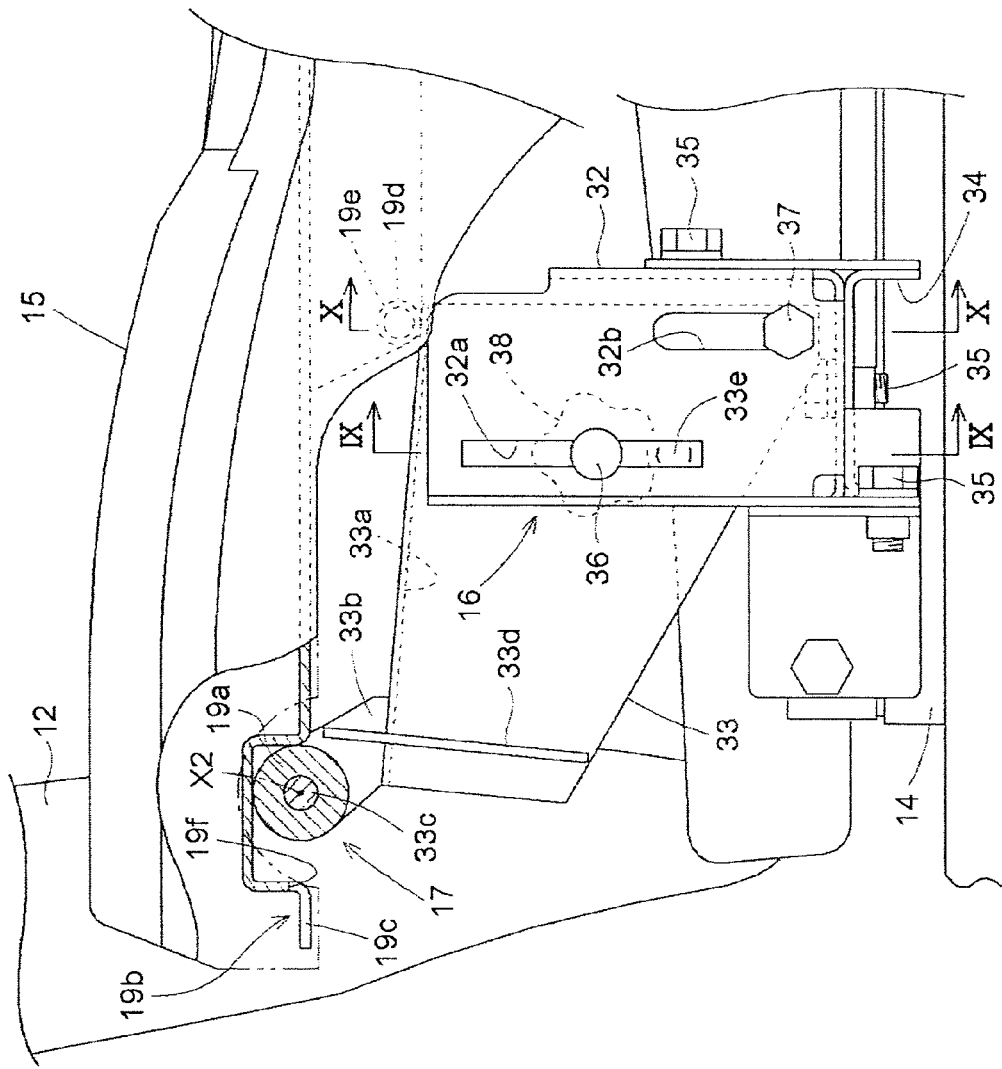
FIG. 6 shows a partial cross-sectional right side view of a height adjustment mechanism and a flip-up mechanism.

First, the knob nut 38 is loosened to release the fixation of the bracket 33 from the base 32. Then, the bracket 33 is moved in the up/down direction relative to the base 32 to adjust the height of the armrest 15 relative to the driver seat 12. The second bolt 37 is fastened with a fastening force that does not interfere with the movement of the bracket 33 in the up/down direction relative to the base 32. Lastly, the knob nut 38 is fastened to fixed the bracket 33 to the base 32 at a desired adjustment height. FIG. 3 illustrates a state where the armrest 15 is positioned at the highest position, and FIG. 6 illustrates a state where the armrest 15 is positioned at the lowest position.

As described above, the projection 33e is in contact with the edge portions of the first elongated hole 32a of the base 32. A friction force is thus provided between the edge portions of the projection 33e and the first elongated hole 32a. Accordingly, even without fastening the first bolt 36 tightly via the nut 38, a certain level of holding force is exerted by the friction force.

Furthermore, as described above, the first elongated hole 32a and the second elongated hole 32b are provided in the base 32. Specifically, of the base 32 and the bracket 33, the first elongated hole 32a and the second elongated hole 32b are provided in the base 32, which is positioned on the outer side in the lateral direction. In other words, of the base 32 and the bracket 33, the first elongated hole 32a and the second elongated hole 32b are provided in the base 32, which is positioned on a side opposite from the driver seat 12 in the vehicle-width direction. In this regard, in a case where an elongated hole corresponding to the first elongated hole 32a and an elongated hole corresponding to the second elongated hole 32b are hypothetically instead provided in the bracket 33, when the bracket 33 is moved upward and downward relative to the base 32, an object (for example, clothing of a driver sitting on the driver seat 12) is could be caught in the elongated holes. However, this is less likely to happen when the holes 32a and 32b are in the base 32.

Flip-Up Mechanism

Figure 12:
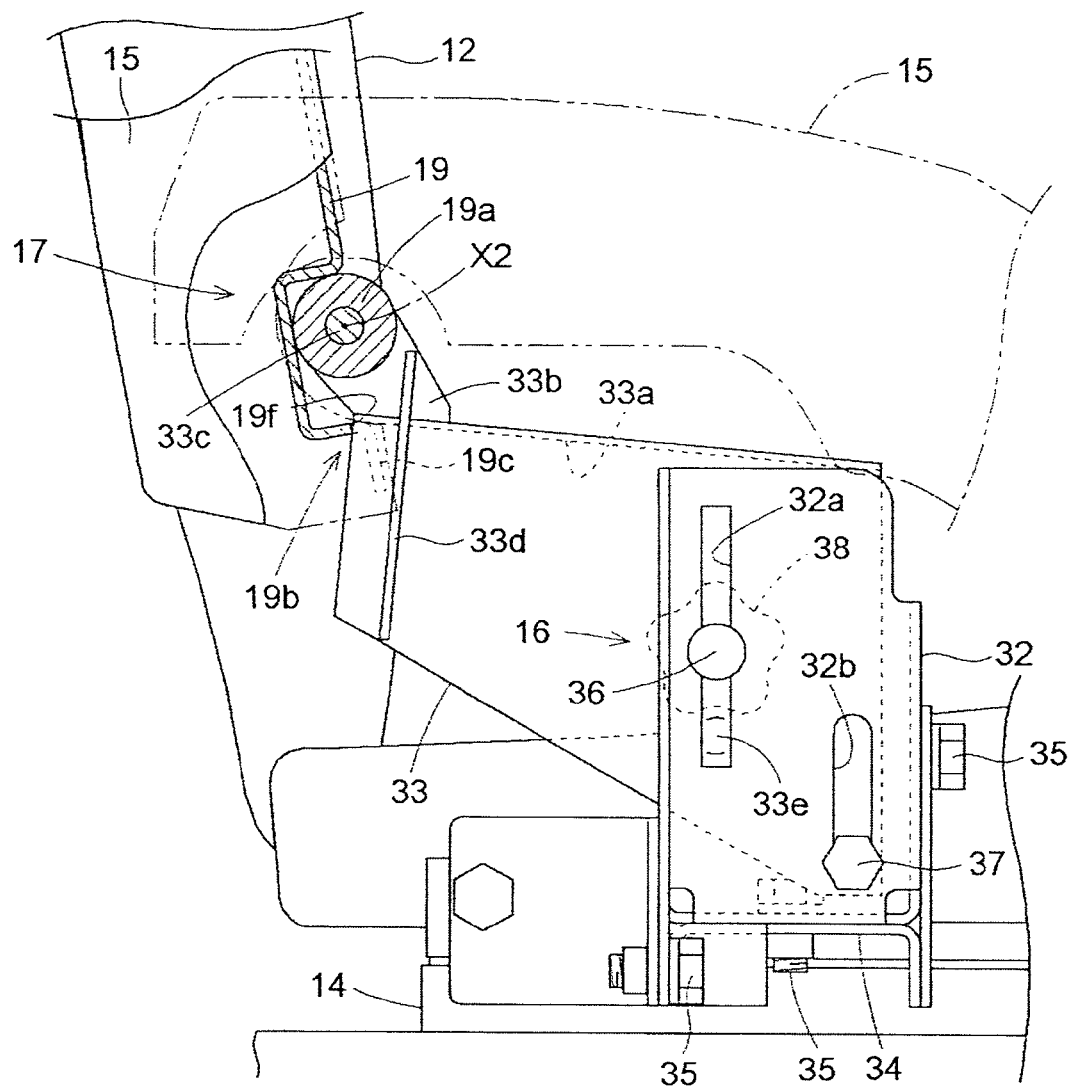
FIG. 12 shows a partial cross-sectional right side view illustrating a state where the armrest is flipped up at a non-use position.

With reference to FIG. 12, the flip-up mechanism 17 swingably supports the armrest 15 around a swing shaft center X2 in the left/right direction. The flip-up mechanism 17 flips up the armrest 15 from a use position (or illustrated down position) to a non-use position (or illustrated up position). The flip-up mechanism 17 is located to the rear of the height adjustment mechanism 16 of the armrest 15, specifically, a rear end portion of the armrest 15. In this way, the swing shaft center X2 is positioned in the rear end portion of the armrest 15.

The flip-up mechanism 17 includes the bracket 33 supporting the armrest 15, the swing shaft 33c in the left/right direction allowing the armrest 15 to be swingably provided, and a friction holding mechanism 40 capable of friction-holding the armrest 15 to the swing shaft 33c. As described above, the height adjustment mechanism 16 includes the bracket 33, which is provided on the armrest 15. The bracket 33 of the flip-up mechanism 17 and the bracket 33 of the height adjustment mechanism 16 are thus the same component. A boss 19a of the frame 19 is swingably coupled to the swing shaft 33c.

Friction Holding Mechanism

Figure 13:
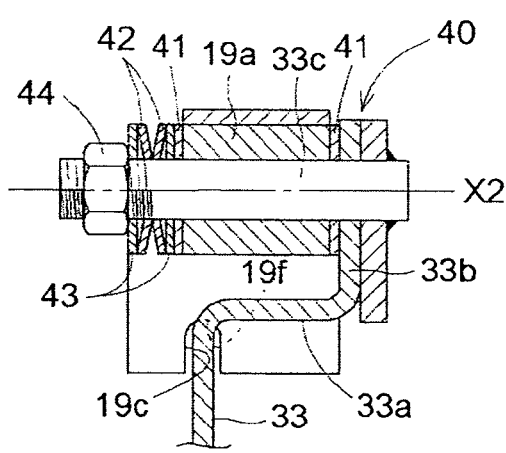
FIG. 13 shows a cross-sectional view of a friction holding mechanism used on the armrest apparatus.

With reference to FIG. 13, the friction holding mechanism 40 utilizes a pair of friction plates or washers 41 and a pair of disc springs or spring washers 42. The pair of friction plates 41 are positioned so as to hold the sleeve or boss 19a of the frame 19 from both the left and right sides and act on the boss 19a of the frame 19 from both the left and right sides. The pair of disc springs 42 are positioned on the right side of the boss 19a of the frame 19 so as to press the pair of friction plates 41 against the boss 19a of the frame 19 from both the left and right sides. The pair of disc springs 42 are held between a pair of plain or flat washers 43 from both the left and right sides. A nut 44 is arranged on a right end portion of the swing shaft 33c to adjust a biasing force of the disc springs 42.

In this configuration, a friction force is generated between the left end of the boss 19a of the frame 19 and the support 33b of the bracket 33 and between the right end of the boss 19a of the frame 19 and the left washer 43 of the pair of the washers 43. Thus, the armrest 15 can be friction-held at the use position and the non-use position. To adjust the friction force, the nut 44 can be fastened or loosened.

The bent portion 19b is bent substantially in an L shape and is located to a rear end portion of the frame 19. A harness (not shown) for operation in the armrest apparatus 13 can be attached to the bending portion 19b via a clamp. A notch 19c is also arranged in a rear end portion of the bent portion 19b.

Figure 7:
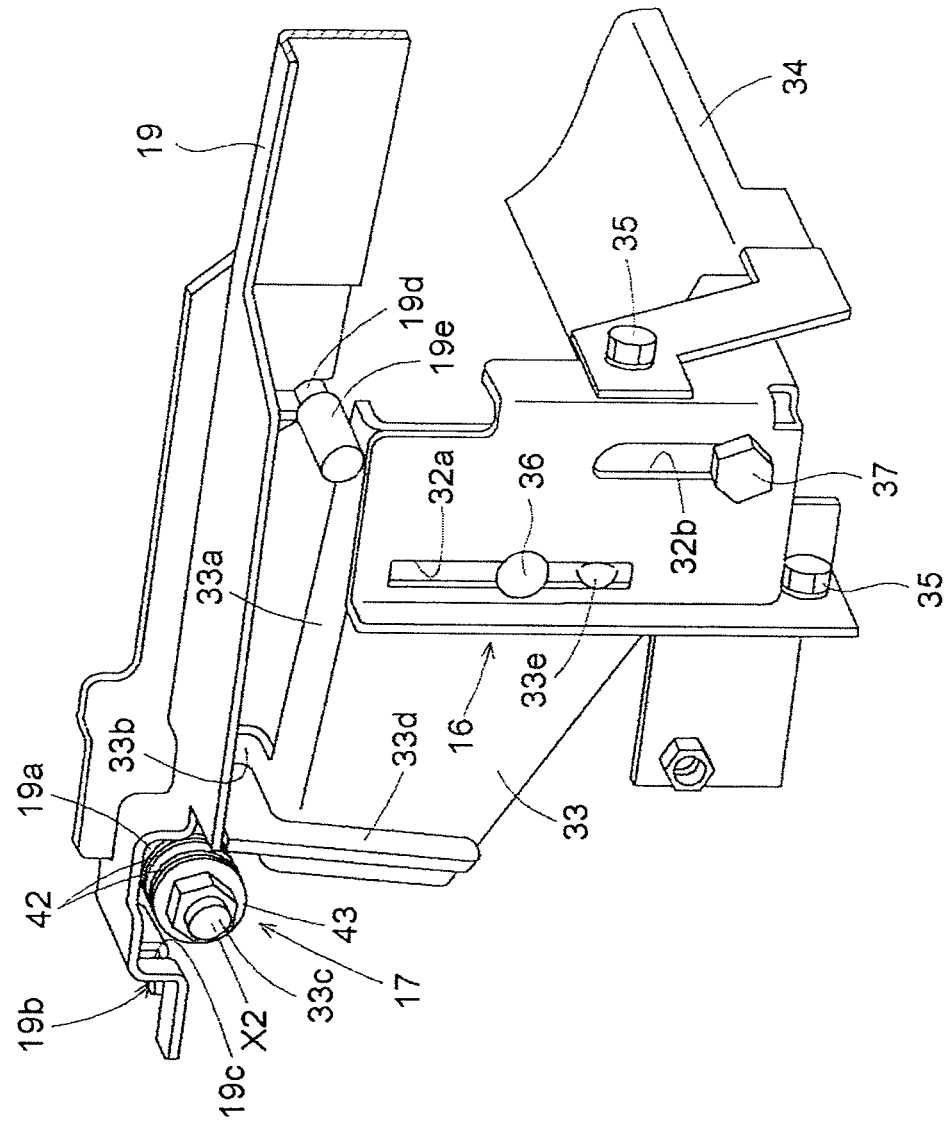
FIG. 7 shows a right perspective view of the height adjustment mechanism and the flip-up mechanism.
Figure 8:
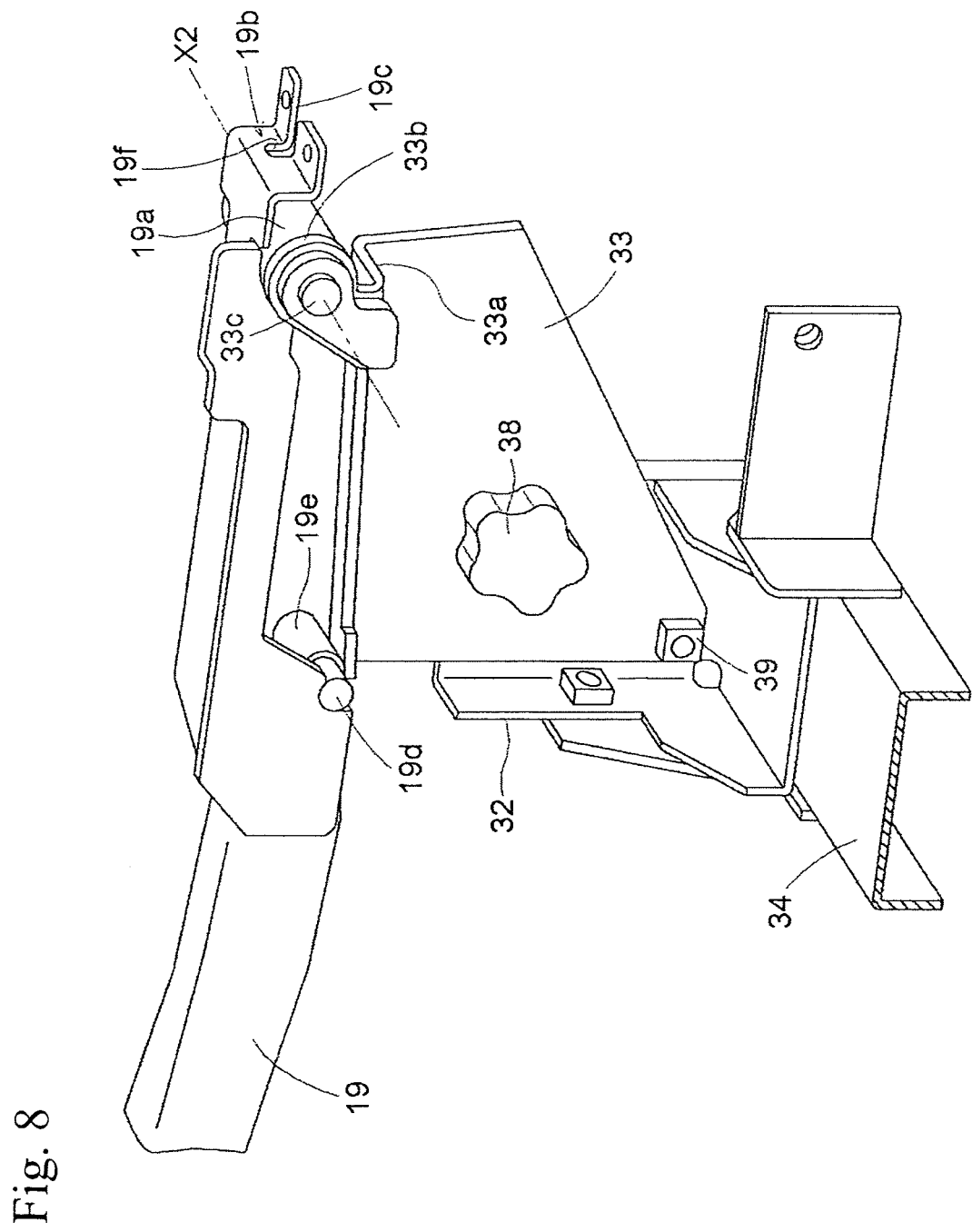
FIG. 8 shows a left perspective view of the height adjustment mechanism and the flip-up mechanism.
Figure 9:
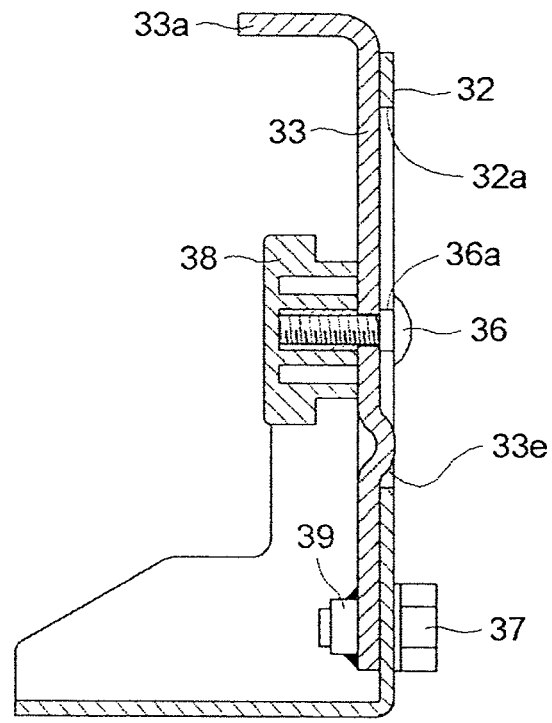
FIG. 9 shows a cross-sectional view along IX-IX of FIG. 6.
Figure 10:
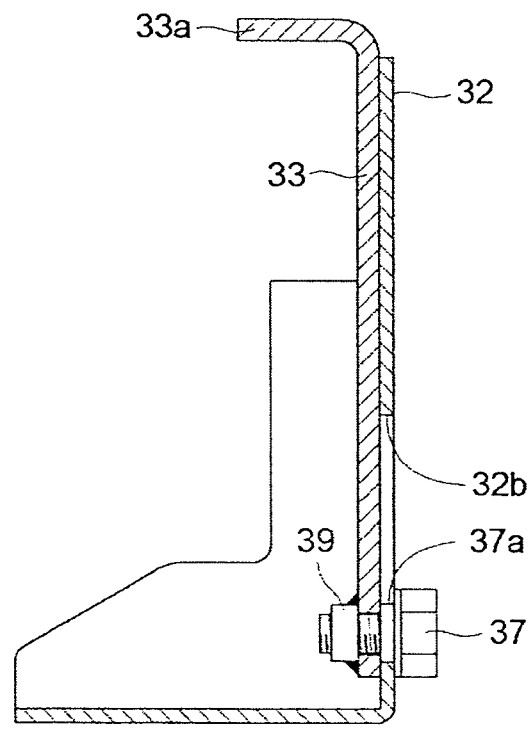
FIG. 10 shows a cross-sectional view along X-X of FIG. 6.
Figure 11:
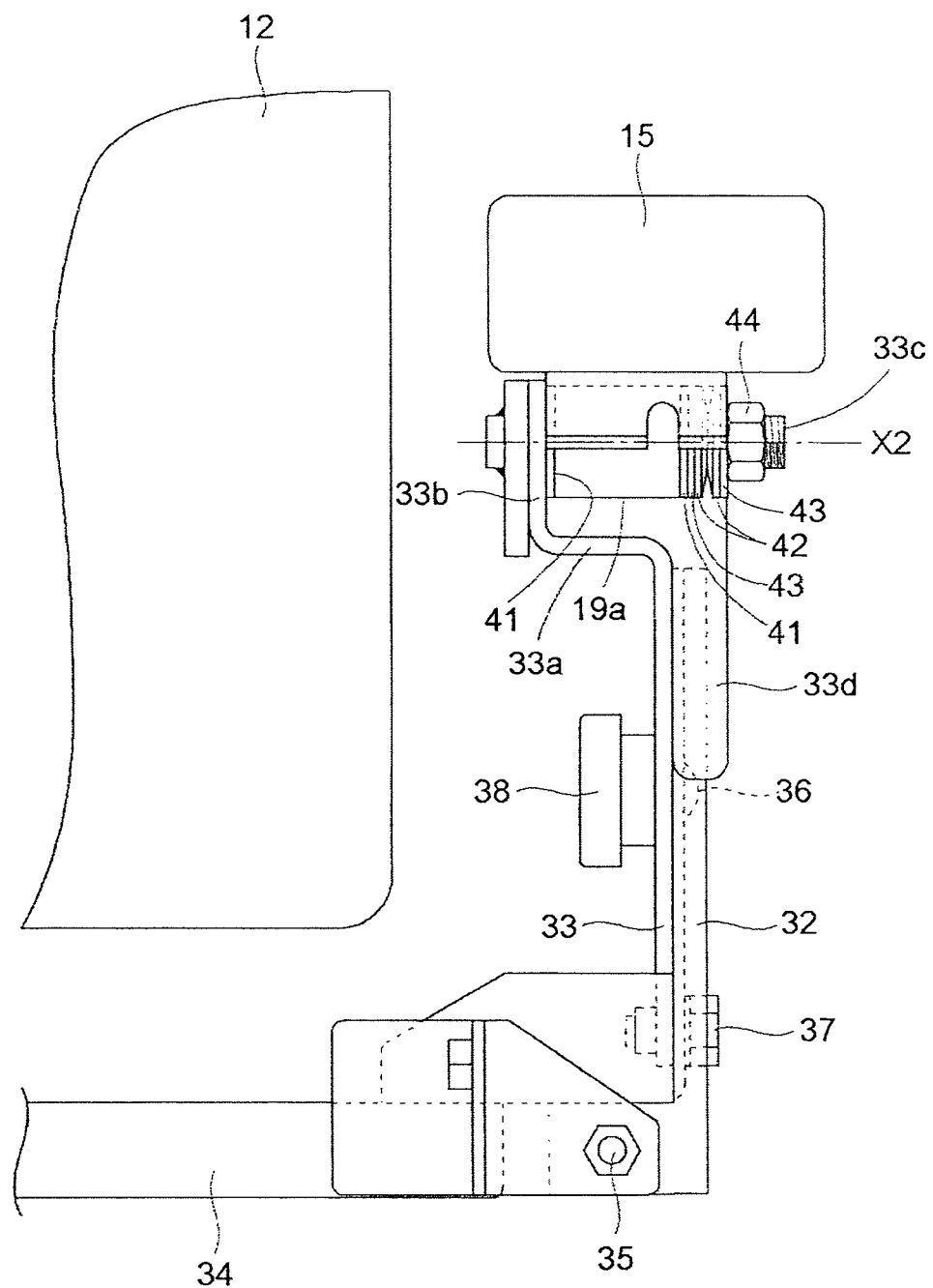
FIG. 11 shows a rear view of the height adjustment mechanism and the flip-up mechanism.

With reference to FIGS. 6 and 7, a stopper shaft 19d in the left/right direction projects to the right from the frame 19. The stopper shaft 19d is positioned so as to be capable of contacting the front end portion of the portion 33a of the bracket 33 from above. A rubber bumper 19e is arranged on the stopper shaft 19d.

With reference to FIG. 6, one can see that when the armrest 15 is at the down or use position, the stopper shaft 19d is in contact with the front end portion of the portion 33a of the bracket 33. This limits downward swing movement of the armrest 15. Meanwhile, with reference to FIG. 12, when the armrest 15 is at the up or non-use position, the rear end portion of the bracket 33 is inserted to the notch 19c of the portion 19b and an end edge 19f of the notch 19c is in contact with the rear end of the bracket 33. This limits upward swing of the armrest 15. Thus, the bracket 33 determines a flip-up amount of the armrest 15 (upward swing range of the armrest 15).

ALTERNATIVE EMBODIMENTS

In one example, the embodiment described above showing the armrest 15 on the right side portion of the driver seat 12 is alternatively arranged so that the armrest 15 may instead be provided to the left side portion of the driver seat 12.

In one example, instead of the "operation portion" of the lift switch 31 for raising and lowering the rotary tiller 7 being arranged as shown, the "operation portion" may instead be an operation portion for change speed operation of the work machine or an operation portion for clutch operation of the work machine.

Figure 14A:
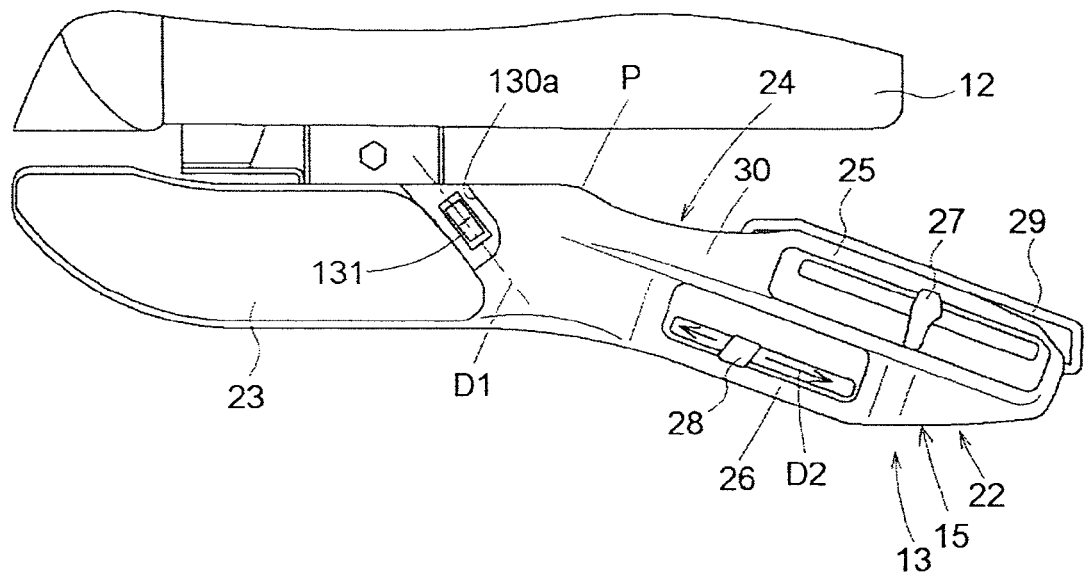
FIG. 14(a) shows a top or plan view illustrating placement of a lift switch usable with the armrest apparatus according to a first alternative embodiment.

In the embodiment shown above, the swing direction D1 of the lift switch 31 is provided so as to be substantially parallel with the swing direction D2 of the lift lever 28. However, the present invention is not so limited. With reference to FIG. 14(a), for example, the swing direction D1 of the lift switch 131 may instead be arranged obliquely (and/or non-parallel) relative to the swing direction D2 of the lift lever 28.

Figure 14B:
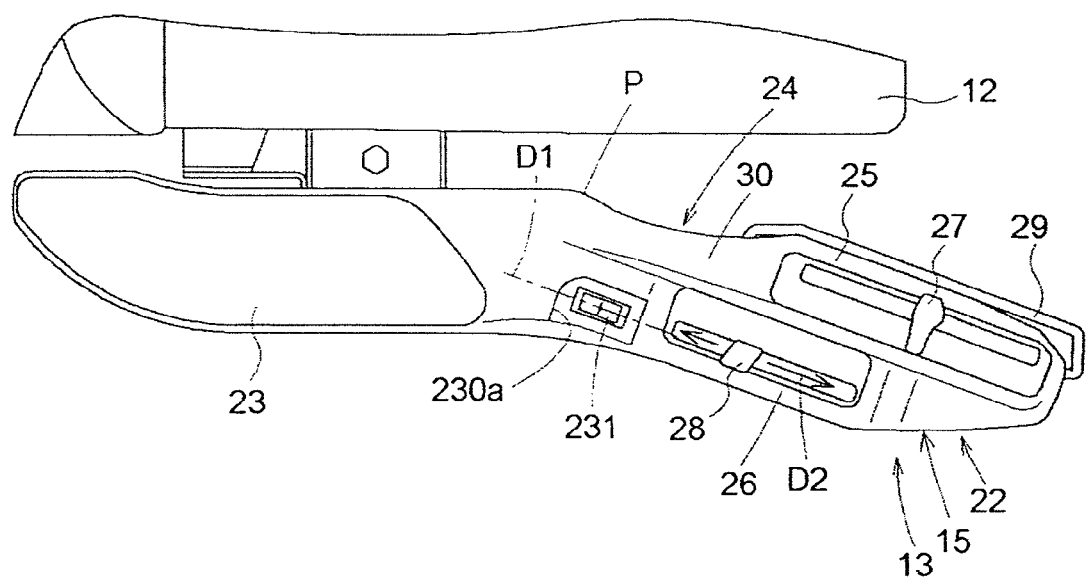
FIG. 14(b) shows a top or plan view illustrating placement of a lift switch according to a second alternative embodiment.

As noted above, the lift switch 31 can be located in the recess 24 in the portion proximate to the inner side in the lateral direction. However, the present invention is not so limited. With reference to FIG. 14(b), for example, a lift switch 231 may be located in the recess 24 in a portion proximate to an outer side in the lateral direction. Specifically, the lift switch 231 may be arranged in the recess 24 in a portion proximate to a side opposite from the driver seat 12 in the vehicle-width direction. In FIG. 14(b), the lift lever 28 and the lift switch 231 are positioned so as to be aligned in the front/rear direction, and the swing direction D1 of the lift switch 231 and the swing direction D2 of the lift lever 28 are arranged so as to be on substantially the same line. This improves operability of the lift lever 28 and the lift switch 231. Alternatively, the swing direction D1 of the lift switch 231 may be located obliquely relative to the swing direction D2 of the lift lever 28.

Furthermore, a recess 130a (230a) may be utilized as a portion corresponding to the lift switch 131 (231) in any way shown in any of the drawings.

In the embodiment shown above, the recess 30a is located adjacent to the recess 24 (upper-left surface 30) in the portion corresponding to the lift switch 31, whereby the recess 30a is located downward relative to the portion other than the portion corresponding to the lift switch 31 in the upper-left surface 30. However, the present invention is not limited to this. Specifically, the portion corresponding to the lift switch 31 of the recess 24 (upper-left surface 30) may be substantially flat relative to the portion other than the portion corresponding to the lift switch 31 in the upper-left surface 30.

In the embodiment shown above, the lift switch 31 is positioned to the rear of the lift lever 28. Alternatively, the lift switch 31 may be positioned in the front of the lift lever 28.

Furthermore, the lift switch 31 is provided to the left of the lift lever 28. Alternatively, the lift switch 31 may be provided to the right of the lift lever 28.

To provide the lift switch 31 to the left of the lift lever 28, the lift switch 31 may also be positioned to the left of the change speed lever 27.

In the embodiment shown above, the change speed lever 27 is located more inward in the lateral direction than the lift lever 28. Alternatively, the change speed lever 27 may be provided more outward in the lateral direction than the lift lever 28. Specifically, the change speed lever 27 may be provided further away from the driver seat 12 than the lift lever 28 in the vehicle-width direction.

In the embodiment shown above, the lift switch 31 is a swing switch (seesaw switch). Alternatively, the lift switch 31 may be another type such as a button-type switch or toggle switch.

In the embodiment shown above, the front portion of the lift switch 31 is the lowering operation portion 31a while the rear portion of the lift switch 31 is the raising operation portion 31b. However, the present invention is not limited to this. Specifically, the front portion of the lift switch 31 may be the raising operation portion while the rear portion of the lift switch 31 is the lowering operation portion.

The present invention is also applicable to work vehicles other than tractors, including, e.g., combines, rice transplanters, construction machines, etc.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A work vehicle comprising:
a driver seat;
an armrest arranged on a lateral side of the driver seat;
a height adjustment mechanism adjusting a height of the armrest; and
a flip-up mechanism swinging the armrest around a shaft center oriented in a lateral direction relative to the driver seat, whereby the arm rest can flip up from a use position to a non-use position,
wherein a height position of the flip-up mechanism changes when a height position of the armrest changes via the height adjustment mechanism, and
wherein the flip-up mechanism is located behind the height adjustment mechanism of the armrest.

2. The work vehicle according to claim 1, wherein the flip-up mechanism is arranged on a rear end portion of the armrest.

3. The work vehicle according to claim 2, wherein the flip-up mechanism comprises:
an armrest support member supporting the armrest;
a swing shaft oriented in the lateral direction and being configured to allow the armrest to be swingably attached; and
a friction holding mechanism capable of friction-holding the armrest to the swing shaft.

4. The work vehicle according to claim 2, wherein the height adjustment mechanism comprises:
an armrest support member supporting the armrest;
a base arranged on the lateral side of the driver seat; and
a bolt engagable with an elongated hole arranged on one of the base and the armrest support member, the bolt being configured to connected together the base and the armrest support member.

5. A work vehicle comprising:
a driver seat;
an armrest arranged on a lateral side of the driver seat;
a height adjustment mechanism adjusting a height of the armrest relative to the driver seat; and
a flip-up mechanism configured to allow the armrest to pivot from a use down position to a non-use up position,
wherein a pivot axis of the flip-up mechanism is arranged behind an imaginary line defined by an up and down movement of the height adjustment mechanism,
wherein a height position of the pivot axis moves up and down with the movement of the height adjustment mechanism.

6. The work vehicle according to claim 5, further comprising at least one working machine control member.

7. The work vehicle according to claim 6, wherein the at least one working machine control member is arranged on the armrest.

8. The work vehicle according to claim 6, wherein the at least one working machine control member comprises plural working machine control members arranged on the armrest.

9. The work vehicle according to claim 5, wherein the flip-up mechanism is coupled to the height adjustment mechanism via a height-adjustable bracket located beneath the armrest.

10. The work vehicle according to claim 9, the height-adjustable bracket has one end extending down below an upper surface of a seat base of the driver seat.

11. A work vehicle comprising:
a driver seat;
an armrest arranged on a lateral side of the driver seat;
an armrest support member supporting the armrest;
a base arranged on a lateral side of the driver seat;
a height adjustment mechanism adjusting a height of the armrest; and
a flip-up mechanism structured and arranged to allow the armrest to swing around a shaft center oriented in a lateral direction relative to the driver seat and to move between a use position to a non-use position,
wherein the flip-up mechanism utilizes:
a swing shaft oriented in a lateral direction and coupled to the armrest support member, said swing shaft allowing the armrest to be swingably attached; and
a friction holding mechanism capable of friction-holding the armrest to the swing shaft,
wherein a height position of the swing shaft changes with height adjustment of the height adjustment mechanism,
wherein the flip-up mechanism is coupled to the height adjustment mechanism via a height-adjustable bracket located beneath the armrest, and
wherein the height-adjustable bracket has one end extending down below an upper surface of a seat base of the driver seat.

12. A work vehicle comprising:
a driver seat;
an armrest arranged on a lateral side of the driver seat;
a height adjustment mechanism adjusting a height of the armrest; and
a flip-up mechanism swinging the armrest around a shaft center oriented in a lateral direction relative to the driver seat, whereby the arm rest can flip up from a use position to a non-use position,
wherein a height position of the flip-up mechanism changes when a height position of the armrest changes via the height adjustment mechanism,
wherein the flip-up mechanism is coupled to the height adjustment mechanism via a height-adjustable bracket located beneath the armrest, and
wherein the height-adjustable bracket has one end extending down below an upper surface of a seat base of the driver seat.

* * * * *